(12) United States Patent
O'Leary

(10) Patent No.: US 9,934,602 B2
(45) Date of Patent: Apr. 3, 2018

(54) SYSTEM, METHOD AND DEVICE FOR THREE-DIMENSIONAL MODELING

(71) Applicant: Happy L-Lord AB, Stockholm (SE)

(72) Inventor: Robert O'Leary, Paris (FR)

(73) Assignee: Happy L-Lord AB, Stockholm (SE)

( * ) Notice: Subject to any disclaimer, the term of this patent is extended or adjusted under 35 U.S.C. 154(b) by 18 days.

(21) Appl. No.: 15/069,134

(22) Filed: Mar. 14, 2016

(65) Prior Publication Data
US 2016/0267705 A1      Sep. 15, 2016

Related U.S. Application Data

(60) Provisional application No. 62/131,974, filed on Mar. 12, 2015.

(51) Int. Cl.
| | |
|---|---|
| G06T 15/08 | (2011.01) |
| G06T 17/00 | (2006.01) |
| G06T 17/20 | (2006.01) |
| G06T 19/20 | (2011.01) |
| G06F 3/0481 | (2013.01) |
| G06F 3/14 | (2006.01) |
| G06T 1/20 | (2006.01) |
| G06T 13/20 | (2011.01) |

(52) U.S. Cl.
CPC .......... *G06T 15/08* (2013.01); *G06F 3/04815* (2013.01); *G06F 3/14* (2013.01); *G06T 1/20* (2013.01); *G06T 13/20* (2013.01); *G06T 17/00* (2013.01); *G06T 17/20* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 2008/0144903 A1* | 6/2008 | Wang | G06T 15/08 382/130 |
| 2013/0076747 A1* | 3/2013 | Koenig | G06T 15/08 345/424 |
| 2016/0101570 A1* | 4/2016 | Iorio | B29C 67/0088 700/98 |

OTHER PUBLICATIONS

Mwalongo, Finian, et al. "Visualization of molecular structures using state-of-the-art techniques in WebGL." Proceedings of the 19th International ACM Conference on 3D Web Technologies. ACM, 2014.*
Norton, Alan, and Alyn Rockwood. "Enabling view-dependent progressive volume visualization on the grid." IEEE Computer Graphics and Applications 23.2 (2003): 22-31.*
Physiome.jp (2013) Retrieved from http://physiome.jp/tools/physiovisualizer/documents/dataformat_v1_ORC.html on May 26, 2017.*

* cited by examiner

*Primary Examiner* — Ryan D McCulley
(74) *Attorney, Agent, or Firm* — Van Dyke Law; Raymond Van Dyke

(57) ABSTRACT

Systems and methods for implementing a voxel 3D modeling technique in client server systems, e.g., using a web browser as the main user interface.

58 Claims, 7 Drawing Sheets

Material Voxel Grid + Temperature Voxel Grid + Compression Voxel Grid + · · · = High-Dimensional Voxel Grid

SYSTEM, METHOD AND DEVICE FOR THREE-DIMENSIONAL MODELING

CROSS-REFERENCE TO RELATED APPLICATION

This application claims priority from Provisional Patent Application Ser. No. 62/131,974, filed Mar. 12, 2015, the subject matter of which is incorporated herein by reference in its entirety.

FIELD OF THE INVENTION

The present invention is directed to improvements in three-dimensional (3D) modeling and animation.

BACKGROUND OF THE INVENTION

The rise in computational power and graphical processors have created tools that can craft entire virtual worlds and environments, which are becoming increasingly real with the rise in power and improvements in graphics software and other tools. Industries, such as in the gaming industry, have flourished, particularly games involving massive multi-player online role playing games (MMORGs), where multiple players play against/with the game and fellow players.

Keeping pace with the rise in processing power is the degree of sophistication of the graphics tools and the degree of closeness to reality. With higher resolution displays, animation can appear increasingly lifelike. In current multiplayer online games, such as MMORGs, many diverse players partake of a common scenario or adventure and share a story line. Projections show that these types of "sharing" experiences will increase further with the generation of better technique, such as those shown herein, to better facilitate the experience.

Three-dimensional or 3D modelling and animation systems today are commonly dependent on the user first downloading a client file, which often consists of several gigabytes of data. Also, as is understood in the art, 3D modelling is typically performed utilizing 3D polygon modelling techniques, resulting in the definitions of surfaces/meshes that a 3D-modelling engine can graphically interpret into visualizations.

It should be understood that improvements in imaging capabilities go far beyond just gaming, and these same principles can also be adapted to and applied in various other applications, such use in medical imaging, architectural or building modeling, component or device modeling, and more, encompassing a wide variety of present and potential usages in modeling real world scenarios, as well as imagined or potential scenarios.

However, the increasing technical sophistication of the software tools employed in 3D modeling creates a significant barrier to entry: the requisite technical skill set of the user must now be high. For example, the creations of most current 3D-models employ polygon modeling techniques, which typically requires that the 3D-modeller have extensive training at University-level programs for such polygon 3D-modelling, including advanced math, data structures, and computational modeling algorithms for graphical user interfaces.

What is needed, therefore, is an alternative, simpler modeling approach to encourage users not necessarily so technically trained, particularly on the complex surface-modeling techniques currently employed. One tool employed in the instant invention to provide a simpler paradigm for operation employs voxels in place of the aforesaid surface modeling.

Voxels are volumetric pixels having a variety of benefits, such as being fast and simple. Further, Applicant has found that 3D modelling pursuant to the teachings of the instant invention, employing voxels, can generally be performed by any modestly computer-literate individual. As discussed, voxels involve the 3D modeling of volumes (rather than just surfaces), making the technology simpler to use and understand, i.e., more accessible to the populace.

However, voxel usage comes at a price, and a main drawback of voxel technology is the processor load required. Indeed, as more voxels are added, the inter-voxel complexity rises dramatically, and tracking each voxel, each volumetric component, quickly scales into significant requirements on a computer processor, particularly as the number of voxels and objects described thereby grows. Furthermore, a server client solution in which several, or many clients connect to one server can place significant capacity requirements on the server and on communications between the server and clients.

Again, what is needed is an improved technique and system that addresses the technical problems associated with processor load in the voxel-rich environments of 3D modeling, such as proposed herein.

The present invention solves the various technical problems involved with a voxel 3D modelling and animation system in client architecture systems, such as, for example, implementing systems utilizing HTLM5, a recent fifth version of the powerful Hypertext Markup Language protocol for structuring and presenting content on the Web. The utilization of existing standards and protocols is critical in situations as here, where, many users, often as many as up to 80%, will not choose to download a software client file employing such technology, or will not have the patience to await the completion of the download of a large software client.

There is, therefore, a present need to provide a system, method, technique, device, apparatus and architecture to improve existing modeling methods and make them easier to use, easier to download, and more efficient.

It is, accordingly, an object of the present invention to provide such a modeling system, which can be edited in a simple manner by average users without any (or at most a limited amount of) specialized training.

It is another object of the invention to provide functionality for distributing 3D models and animations created by one user to other users in a simple and effective manner.

SUMMARY OF THE PRESENT INVENTION

The present invention is directed to systems, apparatuses and methods for implementing a voxel 3D modeling technique in client server systems, e.g., using a web browser as the main user interface.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying DRAWINGS, where like reference numerals designate like structural and other elements, in which:

The various FIGURES set forth in the text hereinbelow provide representative views of various aspects and features of a system and method for implementing voxel 3D modeling employing the principles of the present invention in exemplary configurations.

DETAILED DESCRIPTION OF THE PRESENT INVENTION

The present invention will now be described more fully hereinafter with reference to the accompanying DRAWINGS set forth herein, in which preferred embodiments of the invention are shown. It is, of course, understood that this invention may, however, be embodied in many different forms and should not be construed as limited to the embodiments set forth herein; rather, these embodiments are provided so that the disclosure will be thorough and complete, and will fully convey the scope of the invention to those skilled in the art. It is, therefore, to be understood that other embodiments can be utilized and structural changes can be made without departing from the scope of the present invention.

As discussed, the increasing computational power of processors continue to enable higher-order software tools. The usage of voxels, however, can create computational complexity due to the inter-relatedness of the discrete voxels to each other and to the environment. As described and illustrated hereinbelow, the present invention overcomes the technical problems of the equipment, and also overcomes the user knowledge threshold issues of most modelling software, enabling users without advanced software skill sets to employ the advantages of new software modelling tools, such as shown herein.

As set forth hereinbelow, a number of topic categories are employed herein in an effort to fully describe the many features of the instant invention. It should be understood that the categorical delineation employed is exemplary and the ordering and such does not necessarily imply levels of importance apart from the text used.

1. High-Dimensional Voxel Environments

As discussed, volumetric pixels ("Voxels") are an approach to the modelling of three-dimensional spaces and objects contained therein that utilizes the concept of 3D space or grids, in which each point on the grid contains a value. These values can represent any aspect of the voxel environment—for example, binary voxel values can be used to represent "solid" and "not solid" in order to model simple manifold shapes.

Figure 1:
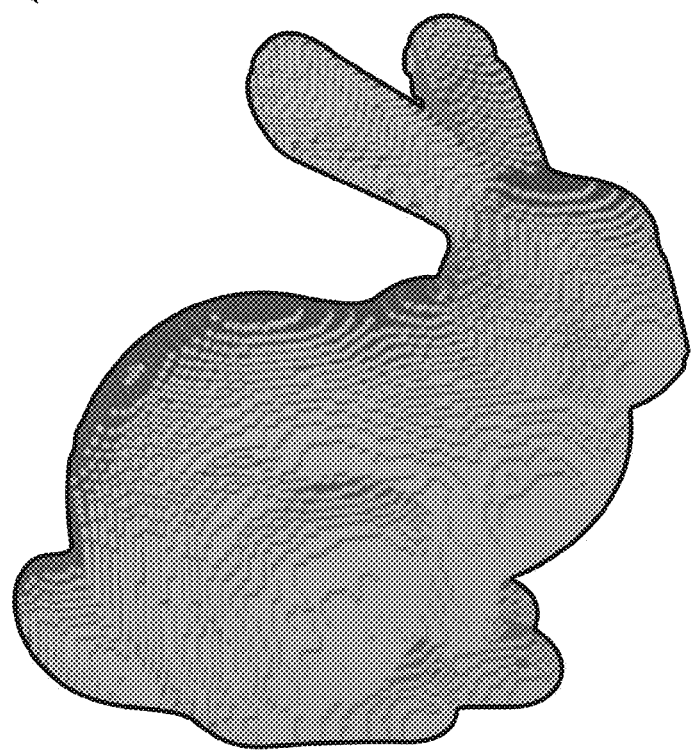
FIG. 1 shows an illustration of a simple manifold graphical shape with binary voxel values defining the shape.

With reference now to FIG. 1 of the DRAWINGS, there is shown a basic representation of a manifold space and image, generally designated by the reference numeral 100. It is readily apparent that the voxel units needed, or granularity of the space is adequate to visually define the shape therein as a rabbit. It is further apparent that the values of all the voxels in image 100 are binary: either void or part of the rabbit shape shown. Thus, a grid or array of the three-dimensional space for image 100 would consist of a matrix of ones and zeroes alone.

It should, of course, be understood that instead of a simple binary usage for the voxels, higher base numbering systems, such as decimal or hexadecimal can instead be used to represent a larger variety of materials in the volumetric modelling of environments and objects—for example, "grass," "wood," "water," etc. In other words, the numerical values associated with each voxel can vary sufficiently to provide demarcations or differences, enabling a higher-level methodology for rendering more complicated images, such as shown hereinbelow.

Figure 2:
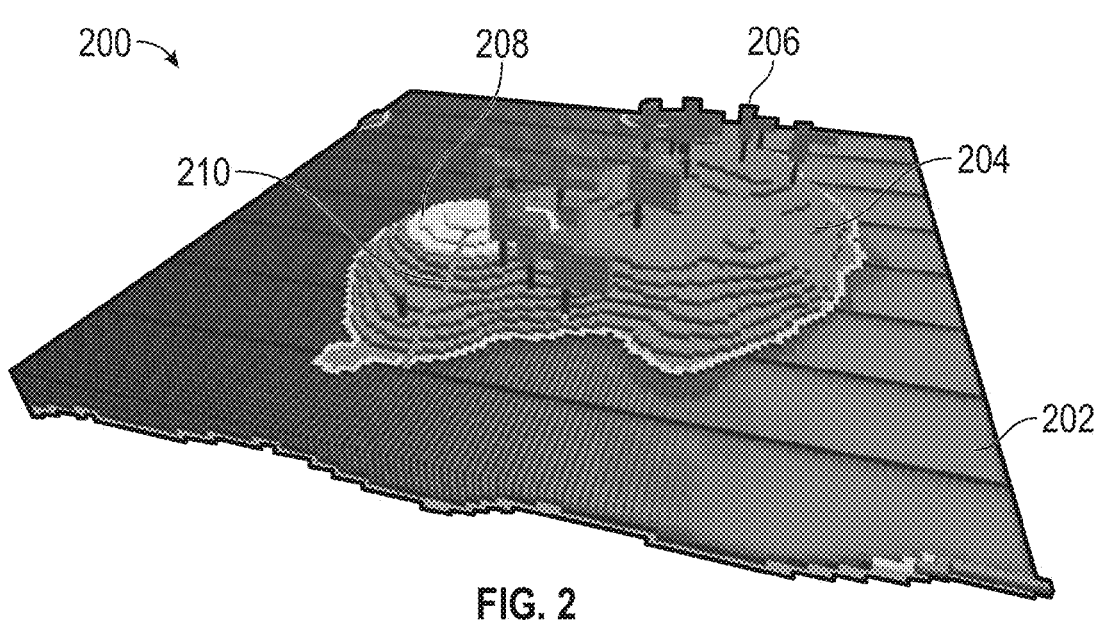
FIG. 2 illustrates an embodiment of a more-detailed graphical shape composed of a number of voxels having multiple values to define the multiple shapes and characteristics.

With reference now to FIG. 2 of the DRAWINGS, there is shown another representation of a space with a much more complex image, generally designated by the reference numeral 200. It is readily apparent that there are a number of gradations between the voxels employed to construct image 200 and to the various delineate discrete portions of the environment or scene with objects thereon, e.g., water, generally designated by the reference numeral 202, an island (or just land), generally designated by the reference numeral 204, trees, generally designated by the reference numeral 206, a glacier (or snow) 208 atop the island 204, a river 210 emanating from the glacier 208, traversing the land 204 and emptying into the water 202, and so forth. Although still simplistic in appearance, the complexity of image 200 over image 100 is markedly advanced.

In the present system model voxel environments using multiple overlaid voxel grids are employed, in order to produce a single high-dimensional grid in which each voxel contains multiple values. As shown in FIG. 2, these values are then used to represent physical and non-physical voxel attributes—for example, materials (the aforementioned "water," "island," "river," etc.), as well as other attributes, not shown, such as temperatures, humidity levels, compression levels, densities, weights, and any other values that can also be modelled numerically.

This expansion of mono-dimensional voxel grids, such as shown and described in connection with image 100 of FIG. 1, to the far-more-detailed multi-dimensional grids employed in the image 200 of FIG. 2 provides for richer, more complex environments. For example, a single voxel might contain a number of discrete characteristics, such as the following values:

Material: Water
Temperature: 101 degrees centigrade
Compression: 0.1
Weight: 18.01528

It should be understood that the combination described above would in fact model steam rather than water, since the attribute or characteristic for temperature is above the boiling point of water, and the compression is sufficiently low for the material to have a lower weight than air.

By so modelling high-dimensional, rather than traditional mono-dimensional, voxel environments, Applicant has found that they can create more expressive environments, which model more complex materials and the interactions between those materials. And, by making these tools simple to use and employ, everyday software users can more easily learn these new techniques and employ them.

Figure 3:
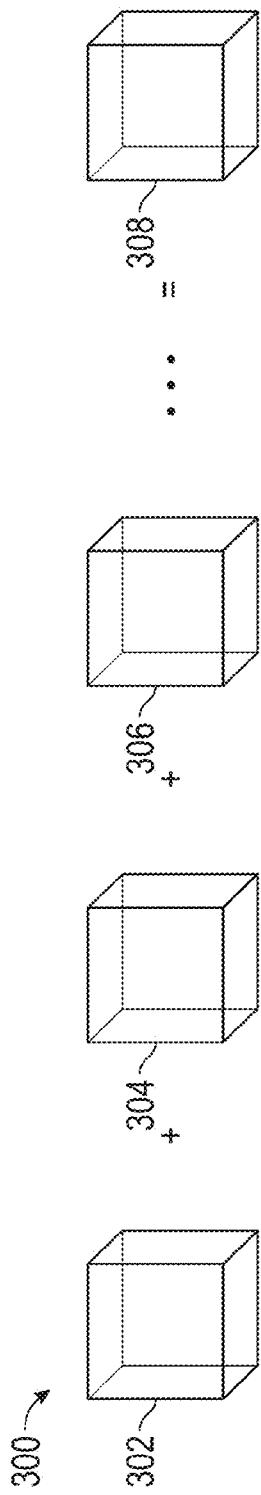
FIG. 3 describes the layering or tiering of discrete voxel grid values into a single high-dimensional voxel grid value according to the present invention.

With reference now to FIG. 3 of the DRAWINGS, there is shown a representation of how the high-dimensional modelling employed by the present invention works, generally designated by the reference numeral 300 in a preferred embodiment. For example, to better visualize the stacking or layering of the attributes within a particular voxel, the various individual characteristics or attributes are shown divided out into a number of voxels with just one attribute, e.g., a material voxel grid, generally designated by the reference numeral 302, a temperature voxel grid, generally designated by the reference numeral 304, a compression voxel grid, generally designated by the reference numeral 306, and so forth for other desired or necessary characteristics or attributes. It should be understood that a wide variety of these discrete, one-dimensional voxel grids for attributes may be so visualized, which are all combined into a single, high-dimensional voxel grid, generally designated by the reference numeral 308, with all of the aforesaid characteristics or attributes represented by respective values within a matrix or grid of values for that voxel, forming a higher dimensional representation.

As discussed, applications for these high-dimensional voxel grids include complex video game environments and the modelling of complex real-world materials for uses in medical or engineering environments—for example, modelling the materials, densities, temperatures, electrical resistances and compressions of animal and plant tissues or composite alloys. By easily imbuing characteristics within respective voxels or groups of voxels (grids), quite complicated and inter-related structures can be modelled far easier than using the more complicated surface-mapping and modelling techniques of the art.

2. Voxel Environments in a Web Browser

Figure 14:
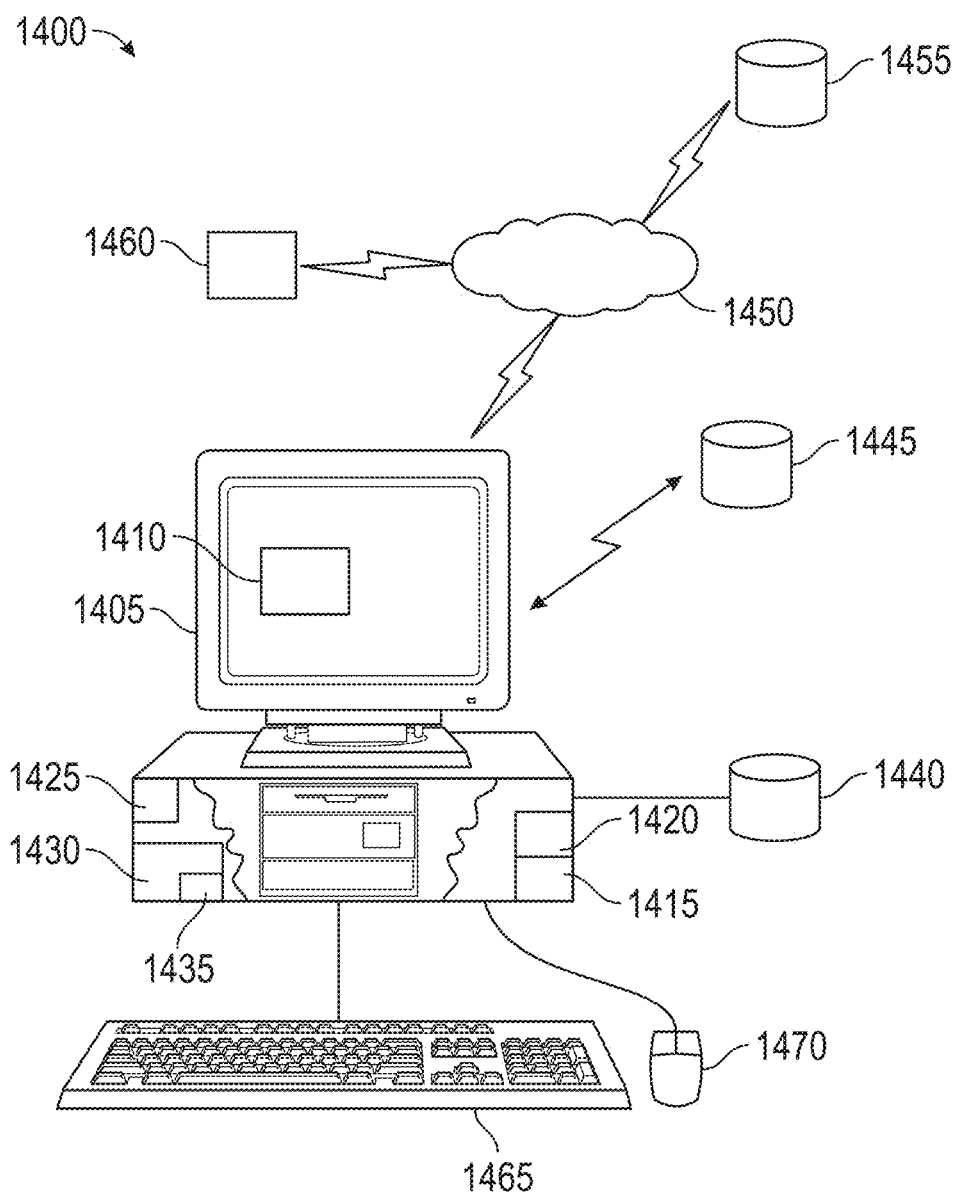
FIG. 14 illustrates an exemplary configuration of components and equipment that may be used in practicing the principles of the present invention.

As discussed, voxel environments typically require large quantities of memory for storage and must be either decompressed in temporary memory (RAM) for reading, e.g., RAM memory 1420 as shown in the computer system 1400 of FIG. 14, or must be stored in data structures with low-performance read times (for example Octrees, which offer read times of O(log(n)), as opposed to simple arrays, which offer read times of O(1)).

The production and rendering of voxel environments has thus been confined to computing environments, such as the desktop computer in which large quantities of working memory and processing power are readily available and custom software download and installation are required, such as the aforementioned computer system 1400, with hard drive 1425 (and other memory), processor 1415 in FIG. 14. As discussed, the download requirement of most software tools is something that interferes with various users' expectations and fears, and they may avoid any program requiring the download of potentially-virus-laden software.

The present invention, however, allows one to instead create and render voxel environments in a standard current web browser, with no requirements for installation of any custom software. The voxel environments are delivered via Hypertext Transfer Protocol (HTTP) requests from standard web servers and are interactive in the browser in real-time, with preferably no requirement for plugins or other non-standard browser or server features.

The instant voxel environments are preferably stored in highly-optimized file formats, such as are easily read using the JavaScript programming language in the browser, and rendered using Web Graphics Library (WebGL), which is also a standard programming language in all modern browsers.

The environments so created are thus accessible and interactive on the web in all modern web browsers on traditional computing platforms, such as desktop and laptop computers, as shown in FIG. 14, as well as platforms, such as tablets and mobile phones, through which these functionalities may be performed instead of on a more traditional desktop personal or gaming system, such as the exemplary computer system 1400 in FIG. 14.

Figure 4:
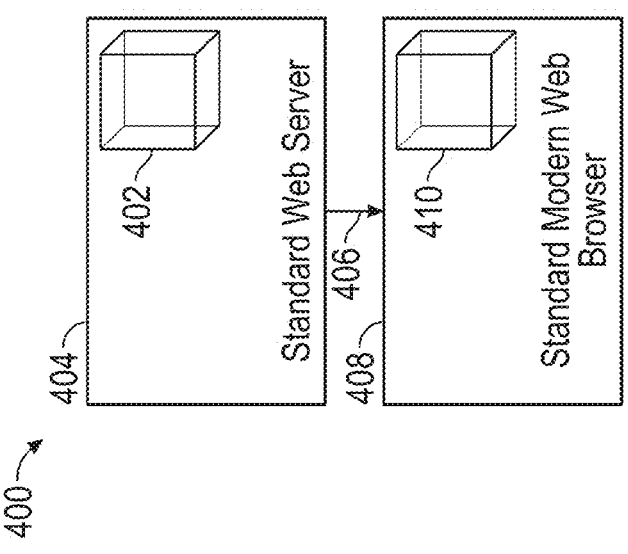
FIG. 4 shows an embodiment of a procedure for the transfer of voxel grid data from a server to a standard web browser for use on the browser pursuant to the principles of the present invention.

With reference now to FIG. 4 of the DRAWINGS, there is shown a representation of the aforesaid web accessibility, generally designated by the reference numeral 400, by which the tools of the present invention allow ease of downloading. As discussed, a voxel grid, generally designated by the reference numeral 402, on a standard web server 404 is delivered via HTTP or via HTTPS (HTTP with the Transport Layer Security), generally designated by the reference numeral 406, to a web browser 408, where a now visible and interactive voxel grid, generally designated by the reference numeral 410, is ready for use by the user, e.g., within the web browser 408 (or the graphical user interface or browser 1410 on computer display 1405 in FIG. 14), as described and shown hereinabove and hereinbelow in connection with the aforesaid FIG. 14, such as in rendering.

3. High-Dimensional Voxel Environments in the Web Browser

Combining the ability in the present invention to create and store complex, high-dimensional voxel environments with the ability to deliver these environments over standard web communication protocols and render them using standard programming languages in modern web browsers, the instant invention can, accordingly, provide complex, high-dimensional voxel environments in the web browser 408, such as by employing the protocols shown and described in connection with FIG. 4 hereinabove and further as set forth hereinbelow.

4. Web-Based Voxel World File Format

Despite the enormous advantages of the voxel usages shown and described, several challenges are presented in any attempt to deliver the aforedescribed voxel environments to the web browser, such as web browser 408, in an efficient and timely manner.

Voxel grids, such as shown in FIG. 4 where each voxel is laden with layers of variables, are typically very large, and thus must usually be delivered piece by piece from the server 404 to the browser 408 in order to avoid a very long wait before loading of the environment and excessive use of working memory to store the entire environment. These so-called pieces of voxel environment are hereafter referred to as "chunks," where the combination of the chunks (or pieces thereof) facilitates the present invention.

It should be understood that any processing required for the rendering of voxel environments will be time-consuming if performed in the browser, such as browser 408 (due to the sandboxed nature of browser-based programming languages), thus such processing must be minimized in order to deliver interactive environments in real time.

Requesting many chunks from a server, such as server 404, will require many HTTP requests. This will, in turn, generate a large communication overhead in the creation and dispatch of requests. This communication overhead, accordingly, limits the performance of web-based voxel environments.

In order to overcome these throughput limitations, the instant invention shows a development of a voxel environment zone file format.

In operation, the voxel environment zone file format combines many of the aforementioned chunks together to produce a smaller number of zone files, each of which contains a part of the whole environment. By way of example, Applicant herein uses a standard 2D grid of 32×32 chunks per zone file. Although this is an exemplary working standard, the size and shape of the grid can, of course, be varied to any zone file size, as is understood to those of skill in the art.

Each chunk is stored as a sequence of bytes. Many chunks are stored together in a single zone file, which is delivered to the browser 408 with a single HTTP 406 request, thus eliminating (or at least significantly minimizing) the limiting factor of communication overhead.

The data segment in a zone file contains, for each chunk: a readable voxel mesh, the grid of voxel data for the chunk, and any additional data pertaining to the chunk in question. Each data element is discussed in more detail hereinbelow.

Figure 5:
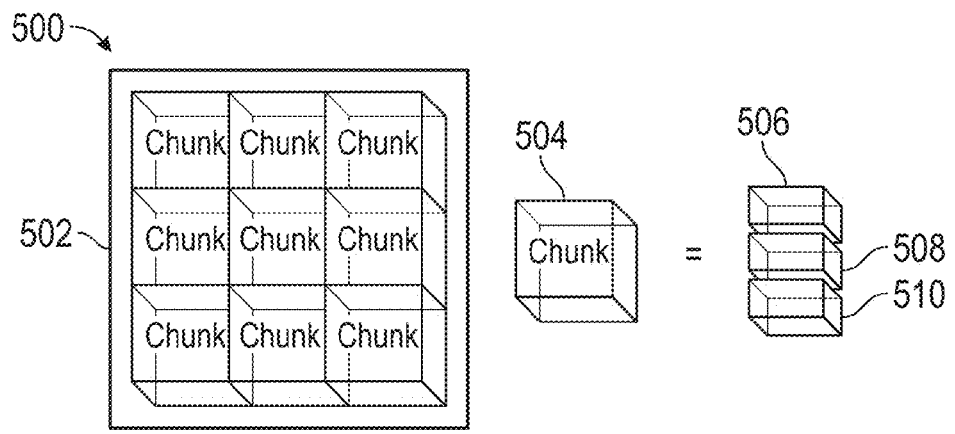
FIG. 5 illustrates an embodiment of a voxel environment zone file structure according to the teachings of the present invention, along with the mesh, voxel data and meta-data associated with each segment or chunk of said voxel environment zone file pursuant to the teachings of the instant invention.

With reference now to FIG. 5 of the DRAWINGS, there is shown a representation of the aforesaid voxel zone file and portions therein, generally designated by the reference numeral 500. As shown in FIG. 5, an exemplary voxel environment zone file, generally designated by the reference numeral 502, contains a number of discrete chunks therein, each generally designated by the reference numeral 504. As discussed, each of the chunks 504 contains mesh, voxel data and meta-data therein.

As discussed and as shown in FIG. 5, each chunk 504 contains readable voxel mesh, generally designated by the reference numeral 506, which is ready for rendering on web browser 408 using WebGL. It should be understood that the term "mesh" means a set of lists of numeric data used to represent a collection of triangles or quadrangles from which a visible object is composed. The minimum data required to constitute a mesh is a set of vertices (points in three-dimensional space) and indices (connections between vertices used to compose triangles, quadrangles or other shapes). However, the file format herein, as described hereinabove, provides for the inclusion of multiple attributes per vertex, thus providing for the rendering of high-dimensional voxel grids.

As also discussed and as shown in FIG. 5, each chunk 504 contains voxel data, generally designated by the reference numeral 508. This data 508 is used to facilitate interaction with the environment—for example, editing of chunks 504 in the aforesaid browser 408 or systems that depend on information about the structure of the environment, such as collision systems and rule-based cellular automata (typically used, for example, for the planning of Artificial Intelligence or AI behaviours or in liquid and gas simulation systems).

Finally, as discussed and as shown in FIG. 5, each chunk 504 contains any additional or extra data required per chunk for the storage of non-voxel entities or meta-data, generally designated by the reference numeral 510. For example, the positioning of animated characters or particle emitters constitutes such meta-data 510.

Figure 6:
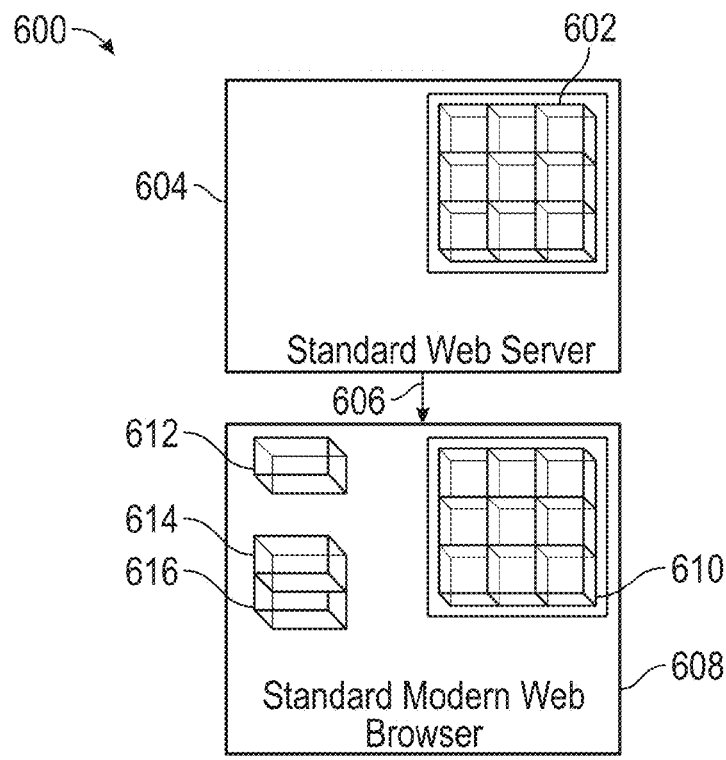
FIG. 6 shows an embodiment of a mechanism for the transfer of a voxel zone file from a server to a standard web browser, along with the decoupling of mesh, voxel data and meta-data therein, according to another embodiment of the present invention.

With reference now to FIG. 6 of the DRAWINGS, there is shown a representation of the aforementioned ease of accessibility, generally designated by the reference numeral 600, which is an improvement over the structures and methodologies shown hereinabove for easing the web accessibility, such as in FIG. 4.

As shown in FIG. 6, a voxel zone file, generally designated by the reference numeral 602 and also 502 hereinabove, contains a number of chunks therein, e.g., nine in the exemplary zone file structuring, is on a standard web server, generally designated by the reference numeral 604. In operation, the voxel zone file 602 is then delivered via HTTP or via HTTPS, generally designated by the reference numeral 606, to a web browser 608, where a now visible and high-performance voxel environment, generally designated by the reference numeral 610, is displayed and ready for use, such as in rendering.

As also shown and described in connection with FIG. 5, voxel mesh (from a chunk 504), generally designated by the reference numeral 612, is sent directly to WebGL for rendering, as described. Also shown are voxel data and meta-data, generally designated by the reference numerals 614 and 616, respectively, which JavaScript systems use for interactive functions, as described hereinabove. It should be understood that the aforesaid voxel mesh 612, voxel data 614, and meta-data 616 for each chunk 504 in the zone file 502/602 are collected for rendering and sent on individually or combined, as described further hereinbelow.

It should be understood that voxel data is preferably stored as a sequence of bytes, addressable using the following format:

$$\text{index} = x + (\text{chunkDepth} * z) + ((\text{chunkWidth} * \text{chunkWidth}) * y)$$

In this way, chunks can be of any width and depth, and can also be of variable heights within the same voxel environment—since the height of the chunk is not necessary when calculating the indices of voxel data. Also, any number of dimensions can be stored in this format, since the indices for multi-dimensional data are simply calculated as:

$$dimension0 = x + (modelWidth * z) + ((modelWidth * modelWidth) * y);$$

$$dimension1 = dimension0 + 1;$$

$$dimension2 = dimension0 + 2;$$

$$dimension3 = dimension0 + 3;$$

...

$$dimensionN = dimension0 + N;$$

5. Web-Based Voxel Model File Format

In addition to the binary voxel chunk file format illustrated and described hereinabove, such as in connection with FIG. 1, the present invention herein is also directed to the development of a binary file format for voxel models, where models are objects like houses, furniture, weapons, body parts (heads, arms, hands, etc.), as well as other types.

This format contains encoded meshes ready to be rendered using WebGL in the browser and the voxel data from which the model is composed.

Since WebGL imposes an upper limit on the size of meshes, such as the voxel mesh 506 hereinabove, that it will render, models above this size are preferably decomposed into multiple meshes within the file and the offsets of the vertices in these meshes are composed of values relative to the center of the model.

In this manner, when the set of meshes for a model are rendered, the model appears to be a single mesh, while in fact being composed of multiple precisely aligned meshes.

Figure 7:
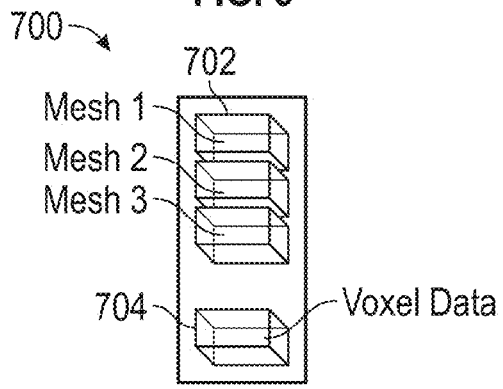
FIG. 7 shows another embodiment of the present invention, where the transfer mechanism illustrated in FIG. 6 is done in pieces.

With reference now to FIG. 7 of the DRAWINGS, there is shown a representation of a number of the aforementioned voxel meshes and data formed into a voxel model file, generally designated by the reference numeral 700. As discussed and illustrated in connection with FIGS. 5 and 6, the voxel mesh 506 and 612, respectively, when in model 700 is decomposed for transfer and then as reconstituted may appear as discrete mesh elements, generally designated by the reference numeral 702, where the multiple meshes 702 for model 700 are directly sent to WebGL for rendering. Also shown in FIG. 7 is voxel data, generally designated by the reference numeral 704, which represents the data (as well as any meta-data) for model 700, where the voxel data is employed for interactive functions, as discussed hereinabove.

In operation, the header of a binary model file 700 contains a list of the number and sizes of mesh 702 segments, as well as the offset of the voxel data 704. The voxel data 704 is high-dimensional, with the file header indicating the number of bytes assigned to each voxel. Voxel data for models is stored in a grid of dimensions equal to the bounding box of the model (the width, height, and depth of the model). This data is stored in a sequence of bytes addressed using the scheme described above for voxel grid data—thus models of high-dimensional voxel data can be stored and rendered.

6. JavaScript Web-Based Voxel World File Interpreter

In particular, once a zone file 802 of voxel chunks, such as file 602, has been downloaded to the browser, such as browser 608 in FIG. 6, the zone file 602 needs to be opened and read using the JavaScript programming language, as discussed. This process is preferably composed of three steps:

(1) Conversion of mesh byte sequences, such as the voxel mesh 612, into usable WebGL buffers;
(2) Extraction of high-dimensional voxel data, such as voxel data 614, into usable JavaScript mono-dimensional arrays; and
(3) Extraction of chunk metadata, such as meta-data 616, into usable JavaScript data structures.

As is understood by those of skill in the art, this process is highly optimized by definition, since the zone file data is already prepared in formats and sequences ready to be used in the target programming languages.

However, WebGL buffers may require data in multiple numeric formats—single bytes for data of low alphabet sizes, Integers for data in larger whole number formats, and Floating Point values for data requiring real number precision. This process of repacking of byte sequences into numeric buffers of variable sizes requires that the byte sequences are reformatted into byte, integer, and float, such as may be employed by JavaScript ArrayBuffers.

In order to allow for the smooth functioning of the user interface of the browser 608 while this packing activity executes, Applicant has developed a system to perform this segmentation of voxel data using a Web Worker—a secondary processing thread which can utilize the multiprocessing capabilities of modern central processing units found in desktop machine and mobile devices, such as the components and equipment shown and described hereinbelow in connection with FIG. 14.

Figure 8:
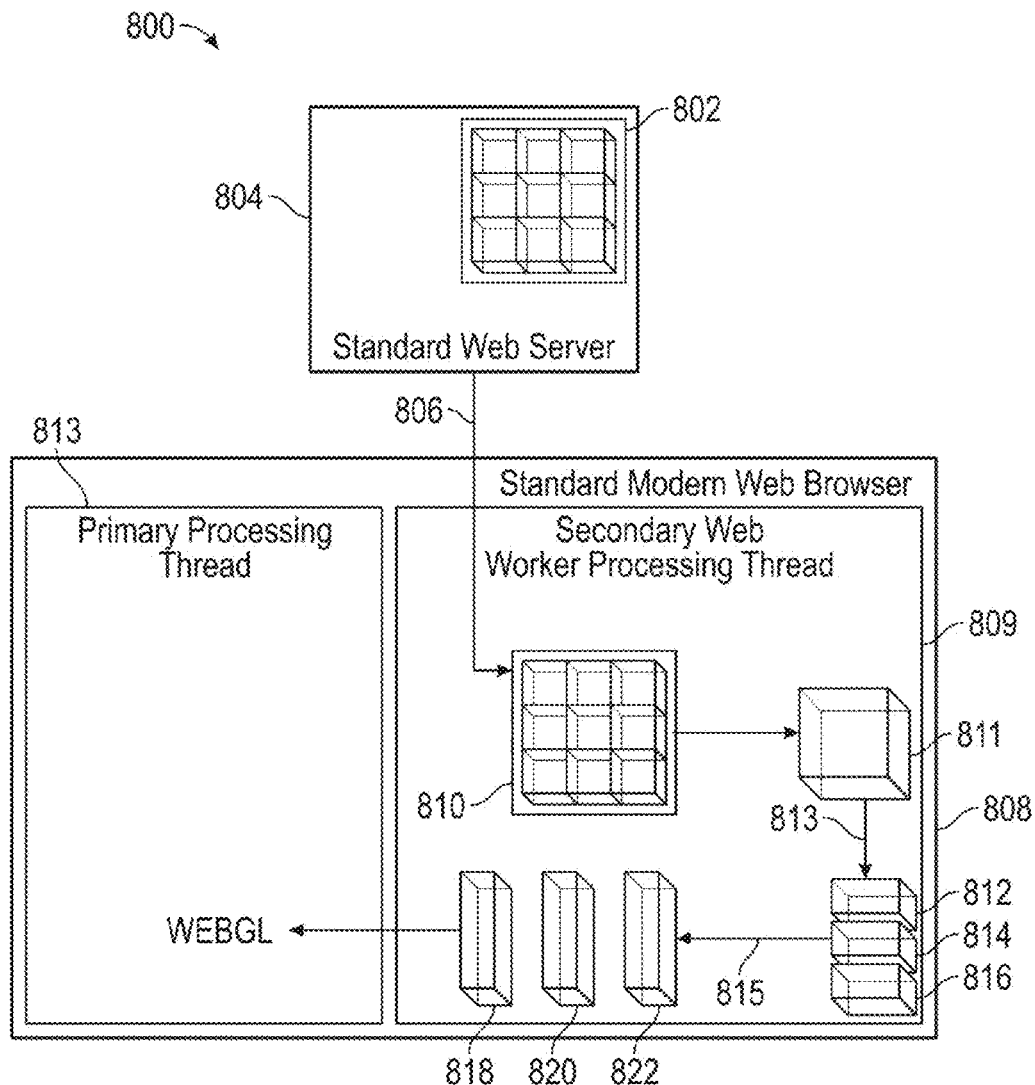
FIG. 8 illustrates another embodiment for the transfer of a voxel grid from a server to a standard web browser, where the browser has a primary thread and a secondary thread therein for processing the voxel data pursuant to the teachings of the present invention.

With reference now to FIG. 8 of the DRAWINGS, there is shown a representation of the above-described, streamlined procedure for the conversion of the data within a voxel model file to the requisite formats, generally designated by the reference numeral 800. As shown, a high dimensional voxel grid (voxel zone file), generally designated by the reference numeral 802, containing a number of chunks therein, is on a standard web server, generally designated by the reference numeral 804. In operation, the voxel grid 802 is then delivered via HTTP or via HTTPS, generally designated by the reference numeral 806, to a standard web browser 808, where a now visible and high-performance voxel environment, generally designated by the reference numeral 810, is made available for rendering or other use, as described. As also shown and described in connection with FIGS. 5-7 hereinabove, for each chunk, such as the chunk generally designated by the reference numeral 811 from that environment had data extracted therefrom, the extraction process being generally designated by the reference numeral 813.

As shown hereinabove and herein for FIG. 8, voxel mesh (from a chunk) is thereby generated, generally designated by the reference numeral 812, as is voxel data, generally designated by the reference numeral 814, and voxel metadata, generally designated by the reference numeral 816, are extracted. The mesh data 812 is then processed through a format mesh buffer, generally designated by the reference numeral 815, into the aforementioned multiple numeric formats, including Byte format, generally designated by the reference numeral 818, Integer (Int) format, generally designated by the reference numeral 820, and Floating Point (Float) format, generally designated by the reference numeral 822, for use in the WebGL operations.

With further reference to FIG. 8, all of the above processing of the respective individual chunks 811 of the aforesaid environment 810 into the respective data formats is done within a so-called Secondary Web Worker Processing Thread, generally designated by the reference numeral 809, which is a process or subroutine within the browser 808. Also shown is a Primary Processing Thread, generally designated by the reference numeral 813, which is a higher-order or more important process or routine, where the mesh data 812, now extracted into the Byte 818, Int 820 and Float 822 components, is sent to WebGL for rendering, as described. It should be understood that the voxel data 814 and meta-data 816 are employed for the aforementioned interactive functions in the Primary Processing Thread 813, as also described.

7. Web-Based Voxel World Mesh Generator

As discussed, in order to generate the aforementioned voxel environment zone files 602 and voxel model files 702, it is necessary to create a system that converts voxel data into renderable meshes 812. It should be understood that these meshes 812 must contain sufficient data to render all aspects of high-dimensional voxel data and must be formatted for use as vertex buffers in the WebGL programming language.

Vertex data that is represented by multiple bytes of data (i.e., Integer and Floating point values) must be generated as sequences of bytes ready for rapid unpacking in the secondary web worker thread 809 of a web browser 808, as illustrated and described in connection with FIG. 8.

Because voxel meshes 812 can contain a large quantity of mesh fragments (triangles or quadrangles composed of vertices, indices, and high-dimensional voxel data buffers), it is necessary for meshes to be highly optimized. Non-optimized meshes will result in excessively large zone files 602, resulting in slow transfer speeds from server 604 to browser 608 and high vertex counts when loaded into buffers on the client graphics chip for rendering via WebGL. Large vertex counts will result in large quantities of system memory being consumed on the graphics card, such as graphics card or chip 1430 as shown in FIG. 14, which will result in frequent paging of data between main memory 1425 and relatively limited graphics memory 1435 on the client machine 1400—which will result in severely reduced performance.

Also, large vertex counts will result in large amounts of processing power on the graphics chip 1430 being dedicated to fragment shading (the process of determining the correct colors for pixels representing mesh fragments). This will result in a severe reduction in the frame rate (the number of milliseconds required to render each frame in a 3D scene) which will result in a slow, unresponsive experience for users.

Finally, this data must be formatted for storage in and reading from binary zone files.

In order to provide for a smooth and efficient experience for users, a mesh generator pursuant to the instant invention operates by first scanning each chunk or model in three dimensions—from top to bottom, left to right, and front to back. Each face of each voxel is examined. If a voxel face is adjacent to another voxel face that is solid (i.e., cannot be seen through when rendered in the browser), then both voxel faces are removed from the mesh since the face is invisible to the viewer.

Figure 9:
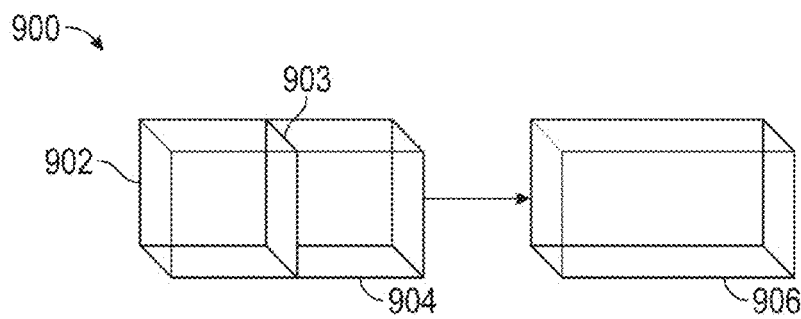
FIG. 9 shows an embodiment of a technique for the simplification of voxel representation.

With reference now to FIG. 9 of the DRAWINGS, there is shown a representation of the above-described procedure merger of voxel faces, generally designated by the reference numeral 900. As shown, a pair of adjacently-arranged voxels, generally designated by the reference numerals 902 and 904, share a common face therebetween, generally designated by the reference numeral 903. Since both voxels 902 and 904 in this embodiment are non-transparent, then the face 903 therebetween cannot be seen by a viewer and is thus irrelevant. In the aforementioned scanning of the voxel faces, the face 903 is removed, resulting in a combined voxel 906, where non-visible voxel faces have been removed.

Further, where adjacent voxel faces are found to be associated with voxels containing identical data in all dimensions, the triangles representing these voxel faces are merged to produce larger segments of mesh, which contain less vertices and thus require less memory to store and less processing power to render.

This generation of high-dimensional optimized meshes, combined with efficient multi-core extraction and delivery of mesh buffers in the browser is the key to achieving real-time delivery and rendering performance of voxel meshes from server to client without any supporting installations or extra downloads, thereby satisfying the aforementioned problems the instant invention has overcome.

8. JavaScript Web-Based Voxel World Mesh Regenerator

Once zone files, such as zone files 602/802, have been delivered to the browser 608/808, unpacked, and the meshes delivered to the graphics card, it is also possible to allow users to modify these meshes in real time. In order to provide for this function, Applicant has developed a highly optimized version of the above-described meshing system, implemented in the JavaScript programming language, and thus executable in any modern web browser. This process of regenerating meshes in the browser allows for real-time editing of meshes, since there is no network delay of the type that would be required if meshes were regenerated on the server and re-downloaded to the browser.

This client-side meshing system is executed in another secondary processing thread in the browser, such as Secondary Thread 809, in order to prevent any interruption to the smooth execution of the primary processing thread, such as thread 813, which would result in uneven performance of the user interface of the browser 808, such as the graphical user interface or browser 1410 as shown on display 1405 in FIG. 14.

Further, all semantics and variable representations in this version of the meshing system are modified to comply with the programming framework of the JavaScript programming language, making the present invention quite compatible.

With the above description and illustration of some of the building blocks employed in building the data structures and processing of the present invention, some particular constructs from those tools are now described.

9. Web-Based Animated Voxel Character Builder

In order to provide for real-time, in-browser editing of not just voxel environments and static models (buildings, furniture, etc.), Applicant has also developed a system that allows for voxel models representing body parts of humans and creatures to be attached to animation skeletons, further building upon the various tools set forth hereinabove and also hereinbelow.

The rotations, transformations, and scales of the joints in this skeleton are then modified on execution of each frame in order to produce visible animation of the body parts in synchronized movements to produce the visual effect of characters and creatures walking, running, swimming, talking, gesticulating, or any other form of motion.

Figure 10:
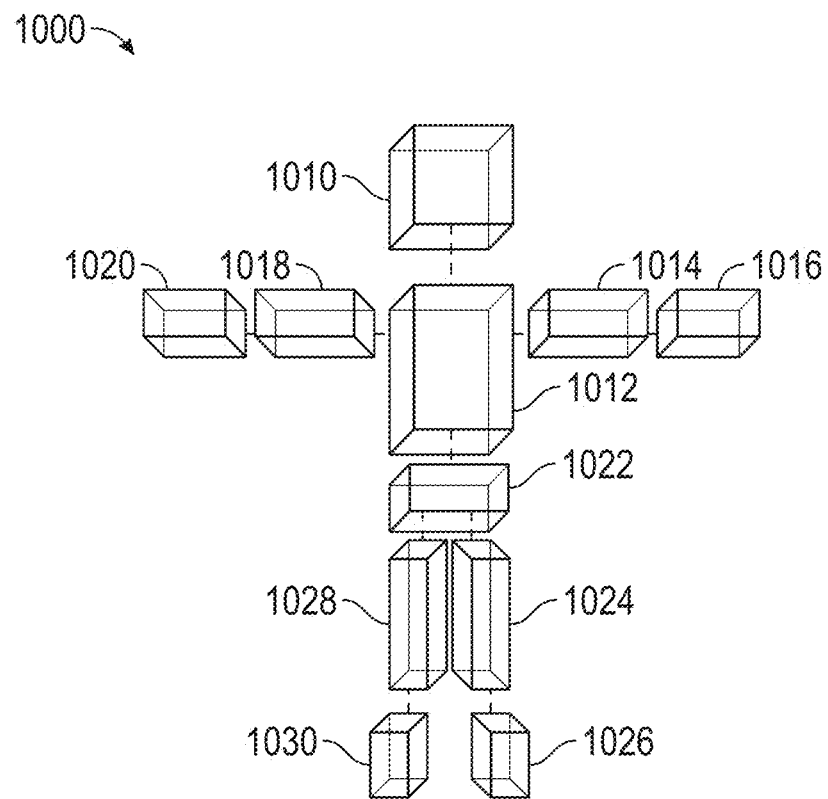
FIG. 10 illustrates a skeleton or framework of a humanoid dynamic model for the representation of humans pursuant to the teachings of the present invention.

With reference now to FIG. 10 of the DRAWINGS, there is shown a representation of the above-described skeleton or body framework, generally designated by the reference numeral 1000. The particular skeleton 1000 shown is humanoid in nature, employing from top-to-bottom, a head portion 1010, an upper body portion 1012, a right arm portion 1014, a right hand portion 1016, a left arm portion 1018, a left hand portion 1020, a lower body portion 1022, a right leg portion 1024, a right foot portion 1026, a left leg portion 1028, and a left foot portion 1030. As discussed, through synchronizing the various movements of the skeleton 1000 portions, the animation can be accomplished with great effect.

It should, of course, be understood that the degree of detail or granularity of the skeleton 1000 may vary, e.g., include fingers, toes, facial features, hair, scars, skin pores, rings and other body adornment, clothes and more, all depending on the particular skeleton and degree of detail desired. Indeed, the body part models attached to skeletons 1000 in this way can be composed of high-dimensional voxel data, and thus models made of complex materials and complex actions can be assembled and animated in a great variety of contexts. The voxel model file format described hereinabove is used to store and transfer voxel body parts for attaching to the aforementioned animation skeletons 1000.

Applicant has also developed a graphical user interface to allow users to choose voxel models to attach details or characteristics to animation skeletons 1000, and thus build their own animated characters and creatures from catalogues of body parts. The graphical user interface and other components and equipment upon which and within the principles of the present invention are preferably practiced are shown in more detail in FIG. 14. It should, of course, be understood that the details discussed herein are exemplary only, and a wide variety of contexts, emotions, actions and events can be easily modelled pursuant to the teachings of the present invention.

10. Web-Based Voxel World Volumetric Lighting System

It should, of course, be understood that one of the dimensions in the high-dimensional voxel models and chunks of the present invention is the dimension of light, a subtle variable that can imbue contexts by simple shading and soft light.

A volumetric light generation system is preferably used to calculate vertical (sun) light and local (artificial) light values for each voxel in a chunk or model, constituting another variable or characteristic. These values are then used to generate lighting data at the vertices of voxel faces in generated meshes. This lighting data, along with all of the other mesh and voxel data, is passed to the WebGL buffers in the web browser 808, and made available to vertex and fragment shading programs, which run on client graphics cards.

In order to optimize the amount of memory used to store lighting values, Applicant in the present invention limits the number of sun and local light values to between 0 and 15 for each voxel. Then, these values are preferably stored in the upper and lower 4 bits of a single byte associated with each voxel, constituting a half byte for the Sun values, and the other half byte for the local light values.

In order to simulate varying degrees of sunlight, in one embodiment of the present invention Applicant extracts these two values in a WebGL fragment shader and multiplies the first (sunlight) by a global sunlight color. This color is varied using custom code written in the JavaScript programming language, which determines the color of sunlight based on simulated day/night cycles (e.g., white for full day, blue for night time, etc.). This global sunlight color is stored as a 1-dimensional texture and made accessible in the WebGL fragment shader, which is preferably another WebGL program also running in the aforementioned Primary Processing Thread 813. This texture is then periodically updated in order to modify the global sunlight color.

The second (local) light value remains unchanged, regardless of the global light level. This results in an efficient simulation of global sunlighting and local artificial lighting on voxel chunks and models without any requirement for runtime calculation of lighting values.

11. Web-Based Voxel World Volumetric Light Coloring System

As well as the base sun and local lighting values, Applicant also includes in the high-dimensional voxel data, colors for local lights. These local light color values are multiplied by the local light values in the aforesaid WebGL fragment shader in order to produce local lighting of varying colors.

Since color values are typically comprised of red, green and blue (RGB) components, these color values have the potential to consume large amounts of memory on the server and client, and to cause a significant reduction in data transfer speeds. Consequently, Applicant in a preferred embodiment of the invention introduces reduced raw RGB values into a limited palette of 216 colors, which approximate the original colors but reduce the total number of possible light color values to within the representable range of a single byte. Thus, light color values can be stored in one byte per voxel, and the data size and transfer speeds remain efficient enough to produce real-time interactive voxel environments, with the various color attributes or characteristics represented.

12. Web-Based Voxel World Shading System

The process of determining the correct color value to apply to each pixel in each fragment of voxel meshes is complex. Multiple variables must be calculated and weighted correctly in WebGL programs in order to ensure consistent functioning of a voxel rendering system.

Applicant has developed custom WebGL programs to provide this function. These programs provide for rendering of base voxel meshes, their local and global lighting, local light colors, and distance fog. With the exclusion of distance fog, any voxel rendering environment that aims to produce rendering of complex voxel data will need to provide for this function. The core of this program (excluding distance fog) functions in this manner:

vec4final_color=texture2$D$(diffuseMap,
 texCoord0·$xy$+mod(texCoord0·$zw$,TILE_SIZE));

float lightCoord=light·$y$/2.0;

final_color·$xyz$*=texture2$D$(lightingMap,vec2(light·$x$,
 0.0))·$xyz$+(lightColor*lightCoord);

gl_FragColor=final_color;

In practicing this program, there are several factors to consider. First, the diffuseMap is a texture atlas of voxel face images. Second, the lighting map is the 1-dimensional global light color texture. Third, texCoord0 is a 4-component vector containing, in order, the texture coordinates of the voxel face in the diffuseMap and the width and height of the mesh fragment measured as a multiple of the TILE_SIZE. Fourth, the TILE_SIZE is 1/N, where the atlas is a square image containing N voxel face image on both the X and Y axes, and fifth, light is a 2-component vector containing the sun and local light values scaled to between 0 and 1. Finally, the lightColor is a 3-component vector containing the unpacked RGB values for the color of the local light.

13. Web-Based Interactive Voxel World Embedding System

Since the present invention has the capability to load and render voxel environments and models in standard modern web browsers, Applicant has developed a system that allows these environments to be embedded in any web page using an iframe with the form:

<$i$frame$src$="[URL]"frameBorder="0"></$i$frame>

Where [URL] is a unique universal resource locator (web address) that identifies a particular voxel environment. This results in an embedded voxel environment in the style of a YouTube or Vimeo video, with which the user can interact, and inside which the user can explore, in a variety of ways.

14. Web-Based Voxel World Portal System

As discussed in detail herein, the present invention is directed to the development of a system that allows users to move from one voxel environment to another without any requirement to exit the environment or use overlaid or other user interface controls. This system allows us to create a network of voxel worlds, providing users with an exploratory experience.

Portal coordinates are stored as meta-data in chunks in zone files. Once loaded in the web browser, portals are activated by users navigating their character to a position intersecting the portal coordinate and cause zone files to be loaded for the target environment and then inserted into the visible scene, replacing the current environment.

Figure 11:
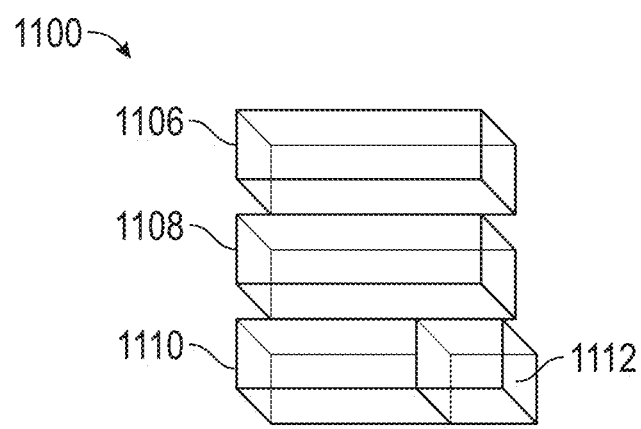
FIG. 11 illustrates an exemplary usage of the voxel meta-data to store portal coordinates therein to facilitate user navigation pursuant to the principles of the instant invention.

With reference now to FIG. 11 of the DRAWINGS, there is illustrated therein an exemplary usage of the various voxel information ported to the browser, generally designated by the reference numeral 1100 including mesh 1106, voxel data 1108 and meta-data 1110. With particular reference to the meta-data 1110, a portion of which, generally designated by the reference numeral 1112, is for storing the aforedescribed portal coordinates for user navigation.

15. Web-Based Voxel World Distributed Event System

As described at length hereinabove, voxel environments are complex and composed of large quantities of data and systems to control the loading, unloading, and rendering of data, as well as assorted interaction and control systems. Furthermore, it should be understood that events can be triggered within voxel environments by user interactions with voxel structures created by users. The events in question may cause activity in systems in both the client browser, such as browser 808, and on one or more servers, such as server 804. In order to facilitate the creation and handling of custom events within this complex framework, Applicant has developed a distributed event systems for voxel environments.

In this improvement, events are handled by a central event dispatching system, and software components register themselves to listen for events. Events can be marked "local" or "distributed," where distributed events are propagated along an event stream (e.g., implemented using HTML5 web sockets) between client and server, or between server and client, as is understood to those of skill in the art.

Figure 12:
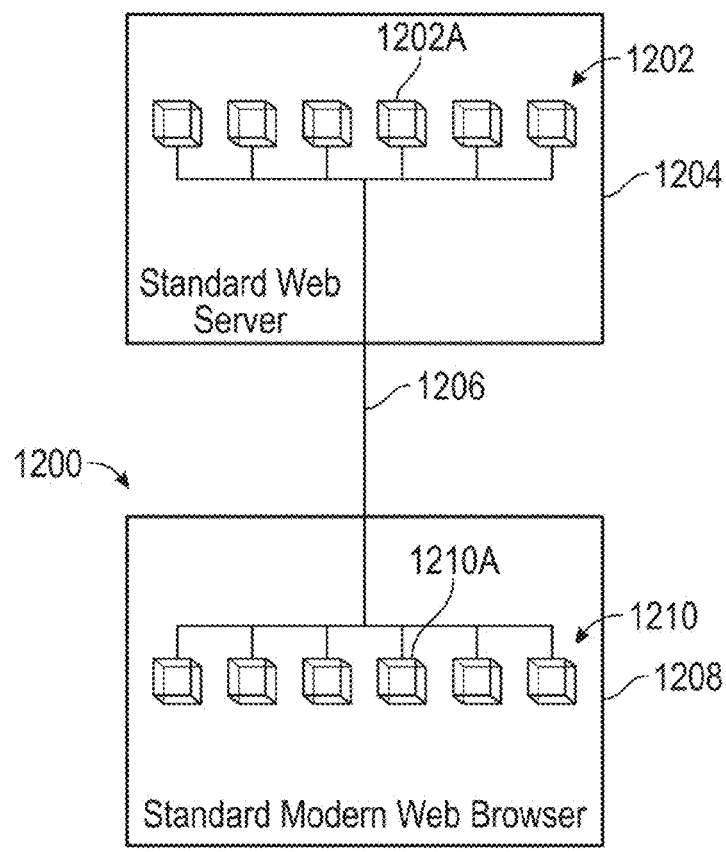
FIG. 12 shows an embodiment for handling the occurrence of a number of events according to the present invention.

With reference now to FIG. 12 of the DRAWINGS, there is illustrated therein an exemplary distributed event system, generally designated by the reference numeral 1200, where a number of voxel grid control systems, generally designated by the reference numeral 1202, are resident on a standard web server 1204. Upon the occurrence of an aforementioned event, e.g., a collision with another character in a MMORG, the event involving voxel grid control system 1202A, then the event is triggered and propagated r passed along an event stream, generally designated by the reference numeral 1206, to the loaded voxel grid control system, generally designated by the reference numeral 1210, for actuating the particular corresponding event, generally designated by the reference numeral 1210A. It should be understood that multiple such events with varying triggers may be so propagated and implemented to reflect different events, as is understood in the art.

This distributed event system allows for the creation of any number of custom events and to propagate them around distributed and local voxel environments without increasing the complexity and of the overall system relative to the number and nature of events propagated or the number of components listening for particular events.

16. Web-Based Voxel Model Catalogue System

In order to allow users to select voxel models for insertion into voxel environments, Applicant has also developed a web-based voxel model catalogue system. This is a Javascript and WebGL-based system that allows 3-dimensional voxel model meshes to be projected on a 2-dimensional plane on top of a 3-dimensional voxel environment.

This system utilizes a flat rectangular mesh placed in front of the camera, which displays a voxel model and is otherwise transparent, allowing the voxel environment to be visible behind.

Figure 13:
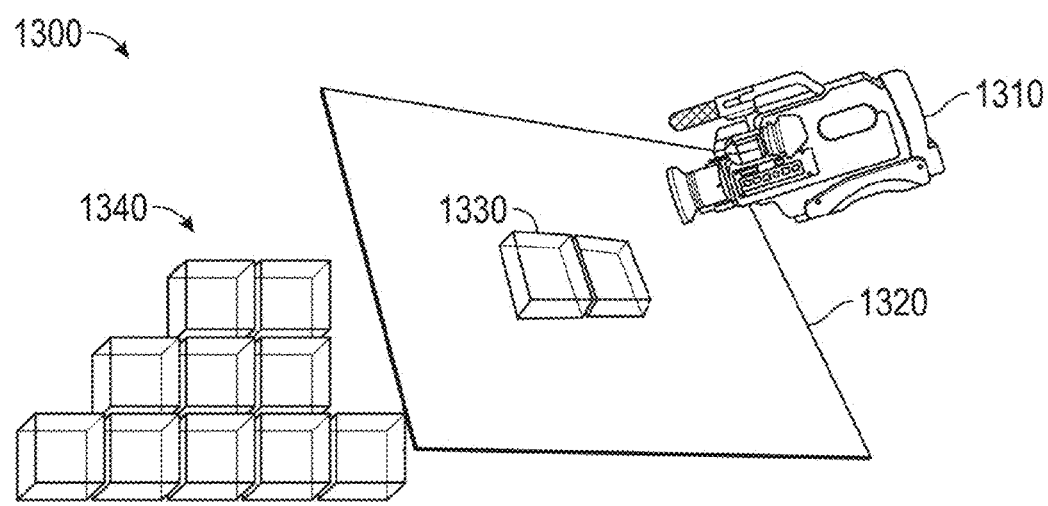
FIG. 13 illustrates a preferred modelling technique for projecting images pursuant to the present invention.

With reference now to FIG. 13 of the DRAWINGS, there is illustrated therein an exemplary technique for creating the models, generally designated by the reference numeral 1300, where a camera 1310 provides the user point of view. Also shown is a flat rectangular mesh or plane, generally designated by the reference numeral 1320, which is a transparent 2D projection plane of a 3D projected voxel model, generally designated by the reference numeral 1330. As also shown, there is a 3D voxel environment, generally designated by the reference numeral 1340, behind the mesh 1320. Thus, the camera 1310 views the projected voxel model 1320 in the desired voxel environment 1340.

17. Javascript Web-Based Voxel Model Scaling System

Some voxel models need to be scaled in order to fit into voxel environments. For example, in a voxel environment in which a standard voxel is (from the user's perspective) one meter cubed, it may be necessary to construct furniture made from smaller voxels in order to create sufficient detail to impart a recognizable shape and size to the model.

In the instant invention, Applicant has created a system that automatically scales voxel models during insertion into the voxel environment, in order to provide for models composed of voxels of varying sizes.

Chunk meta data contains references to voxel model unique identifiers, positioned at local coordinates within the chunk, and occupying a fixed number of full-size voxels (calculated by multiplying the model bounding box by a voxel scale). Model scales are always calculated as a $\frac{1}{2}^{\wedge}N$ (one divided by two to the power of N), in which N is an integer value. Thus, voxel models can be composed of miniature voxels of the size $\frac{1}{2}$, $\frac{1}{4}$, $\frac{1}{8}$, $\frac{1}{16}$, etc. relative to the full voxel size (1).

18. WebGL-Based Voxel Model Ray-Based Rendering System

In addition to the above, Applicant, in the instant invention, has also created a system that allows complex models to be rendered within meshes representing the bounding box of the model. This approach allows one to minimize the number of vertices required to render a model, at the expense of performing more work at runtime in WebGL programs.

In this embodiment, the system loads the voxel model into a 3-dimensional texture (or array of 2 dimensional textures), creates a mesh the size of the voxel bounding box, and uses a WebGL fragment shader to simulate light rays passing through the box, intersecting with the model where the texture contains non-transparent pixels. Each pixel represents a single voxel, so models can be scaled within the box.

19. Web-Based Minecraft World Import System

As discussed, one of the primary aims of the present invention is to improve various aspects of the computer gaming experience, particularly that of MMORGs. To that end, the various tools of the instant invention may be employed in current such games. For example, the system of the present invention allows Minecraft worlds to be imported into the engine (via a web interface), converted to the aforedescribed zone file system (with included meshes) and subsequently delivered to web browsers for users to view and interact with these worlds in the browser, all as described and illustrated at length hereinabove.

In particular, this system has the capability to read Minecraft .MCR and .MCA files, as well as level.dat files and settings files, load this data into our own custom chunk data structures, and then output to our zone file format. In this way Minecraft worlds are made visible and interactive in standard modern web browsers employing the advances of the present invention.

20. Dual-Mode Web-Based Voxel World Camera System

In order to allow users to edit voxel environments and also experience how these environments will look to other users when finished, Applicant has also developed a dual camera system that functions within the web-based voxel environments of the present invention, as described herein. The user can move in "Maker Mode" in which gravity and collision systems are disabled, and the user can edit multiple voxels simultaneously and access model catalogues in order to choose and add models to the environment, and also in "Player Mode", in which gravity and collision systems are activated and the player moves around the environment in a first-person, non-flying mode. The user can switch between Maker and Player mode cameras by just pressing a keyboard button.

21. Web-Based Voxel World Sky System

Additionally, Applicant has developed a complex sky system in order to provide for day/night cycles and weather effects in the web-based voxel environments, such as gaming worlds.

In one embodiment, a dome-shaped mesh is placed over the voxel environment. WebGL vertex and fragment shaders then color this mesh based on a set of atmosphere variables. The base color of the sky and the sun are calculated by simulating light passing through an atmosphere. A perlin noise functioning running in the fragment shader program is used to simulate clouds. Distant mountains are added to the dome by calculating the distance from the bottom of the dome and using a 2D perlin noise functioning to create undulating mountain shapes. A night-time stars texture is projected on the dome as a cube map, and the transparency of the stars texture is determined by Javascript programs running in the browser in order to make stars visible at night and invisible during the day. The dome is tinted around the sun at sunrise and sunset, in order to provide for red sunsets and yellow dawns (though any colors can be used).

With reference now to FIG. 14 of the DRAWINGS, there is illustrated therein an exemplary computer system, generally designated by the reference numeral 1400, where the various aspects of the invention described in detail herein may be implemented and shown. It should, of course, be well understood that that system shown may differ in various instances, e.g., a hard-core gamer would have additional equipment, such as advanced hand and foot control systems to guide gameplay, and head-mounted equipment for enhanced visualization.

Computer system 1400 includes a display 105 upon which the various graphical user interfaces or browsers may be displayed and operated upon, generally designated by the reference numeral 1410. The system 1400 includes a processor 1415, RAM or short-term memory, generally designated by the reference numeral 1420, a hard disk or longer-term memory, generally designated by the reference numeral 1425. As discussed, graphics hardware or chips 1430 may have its own internal memory, generally designated by the reference numeral 1435. Also shown is external memory 140 connected by wire, and external memory 145 connected wirelessly.

As connectivity is important, whether for email or for playing MMORGs, the system 1400 connects through the Internet, generally designated by the reference numeral 1450, to external nodes 1455 or exchanges 1460 to connect with the world. Also shown is a keyboard 165 and a mouse 170 for data and command entry.

The previous descriptions are of preferred embodiments for implementing the invention, and the scope of the invention should not necessarily be limited by these descriptions.

It should be understood that all articles, references and citations recited herein are expressly incorporated by reference in their entirety. The scope of the current invention is defined by the following claims.

What is claimed is:

1. A system for 3D modeling comprising:
   a display, said display displaying 3D animations within a web browser,
   an interface, said interface allowing a user to interact with at least one 3D model,
   a memory, said at least one 3D model being stored within said memory, said at least one 3D model comprising a plurality of voxel information therein, and
   wherein said voxel information comprises a plurality of respective overlaid voxel grids, each said grid having discrete values therein, each said discrete value within each said grid corresponding to a different voxel characteristic,
   wherein said voxel information constitutes a voxel environment, different voxel characteristics describing the voxel environment,
   wherein said voxel information is divided into a plurality of voxel chunks, each said voxel chunk containing therein a portion of said voxel environment,
   wherein respective multiplicities of said voxel chunks comprise respective voxel zone files, a given voxel zone file being transmitted to said web browser,
   wherein, for each voxel chunk in each voxel zone file, said voxel chunk is scanned to remove common voxel faces therein, at least one said common voxel face being removed, and
   wherein said user, interacting with said web browser through said interface, initiates a rendering of said voxel information of said at least one 3D model on said web browser using at least one of said voxel zone files.

2. The system for 3D modeling according to claim 1, wherein said plurality of voxel information comprises respective grids of discrete voxel values, each said voxel value corresponding to a respective voxel characteristic.

3. The system for 3D modeling according to claim 1, wherein said plurality of voxel information is uploaded from a server to said web browser.

4. The system for 3D modeling according to claim 1, wherein each said voxel chunk comprises voxel mesh data, voxel data, voxel meta-data and combinations thereof.

5. The system for 3D modeling according to claim 4, wherein said voxel mesh data comprises byte data, integer data, floating point data, and combinations thereof.

6. The system for 3D modeling according to claim 5, wherein said voxel mesh data comprising said byte data, integer data, floating point data, and combinations thereof are extracted by a secondary processing thread of said system.

7. The system for 3D modeling according to claim 4, wherein said voxel mesh data in at least one voxel zone file received at said web browser is directly readable by said web browser for rendering thereon.

8. The system for 3D modeling according to claim 4, wherein said voxel mesh data is from a plurality of voxel zone files.

9. The system for 3D modeling according to claim 4, wherein said voxel data and said voxel meta-data in at least one voxel zone file received at said web browser are sent to at least one interactive function for said system.

10. The system for 3D modeling according to claim 4, wherein said web browser decouples each of said respective voxel zone files transmitted to said web browser into said voxel mesh data, said voxel data and said voxel meta-data.

11. The system for 3D modeling according to claim 10, wherein said voxel mesh data within each voxel chunk within each voxel zone file is directly readable by said web browser.

12. The system for 3D modeling according to claim 11, wherein said voxel mesh data is directly readable using a WebGL protocol.

13. The system for 3D modeling according to claim 10, wherein said voxel data and said voxel meta-data are readable using a JavaScript protocol.

14. The system for 3D modeling according to claim 4, wherein said voxel mesh data comprises a plurality of sets of vertices and a plurality of indices.

15. The system for 3D modeling according to claim 4, wherein said voxel mesh data comprises a plurality of lists of numeric data representing a plurality of triangles and quadrangles employed to construct said at least one 3D model.

16. The system for 3D modeling according to claim 4, wherein said voxel data comprises at least one interaction of said at least one 3D model within said voxel environment.

17. The system for 3D modeling according to claim 4, wherein said voxel meta-data comprise at least one positioning interaction of said at least one 3D model within said voxel environment.

18. The system for 3D modeling according to claim 1, wherein a plurality of said voxel chunks are combined into a voxel zone file, said voxel zone file being uploaded to said web browser.

19. The system for 3D modeling according to claim 1, wherein said 3D modeling is used in gaming, medical imaging, architectural imaging and device modeling.

20. The system for 3D modeling according to claim 1, wherein said memory is on a server.

21. The system for 3D modeling according to claim 20, wherein said server is a web server.

22. The system for 3D modeling according to claim 1, wherein the transmission of said respective voxel zone files is done pursuant to a protocol request of said web browser.

23. The system for 3D modeling according to claim 22, wherein said protocol request is selected from the group consisting of HTTP, HTTPS and HTML5.

24. The system for 3D modeling according to claim 1, wherein each of said discrete values within said grids corresponds to an attribute selected from the group consisting of physical attributes and non-physical attributes.

25. The system for 3D modeling according to claim 1, wherein the rendering of said at least one 3D model from said voxel information on said web browser is in real time.

26. The system for 3D modeling according to claim 1, wherein said at least one 3D model comprises voxel information for at least one object, said at least one object selected from the group consisting of a skeleton or body framework, head, arm, hand, fingers, torso, leg, foot, toes, facial features, emotions, hair, scars, skin pores, skin color, rings, body adornment, clothes and combinations thereof.

27. The system for 3D modeling according to claim 1, wherein said voxel environment has a physical attribute, said physical attribute selected from the group consisting of ambient light, Sun light, indoor light, nighttime, stars, colors, gravity, and combinations thereof.

28. The system for 3D modeling according to claim 1, wherein said voxel environment has an interaction, said interaction selected from the group consisting of events in said voxel environment, scaling of at least one object vis-à-vis another object in said voxel environment, collisions of two objects in said voxel environment, interactions between two objects in said voxel environment, and combinations thereof.

29. A device for 3D modeling on a web browser comprising:
a processor;
a display with an interface for a user to interact with at least one 3D model on a web browser;
a memory, said at least one 3D model being stored within said memory, said at least one 3D model comprising a plurality of voxel information therein,
wherein said voxel information comprises a plurality of respective overlaid grids, each said grid having discrete values therein, each corresponding said discrete value within each said grid corresponding to a different voxel characteristic,
wherein said voxel information constitutes a voxel environment, different voxel characteristics describing the voxel environment,
wherein said voxel information is divided into a plurality of voxel chunks, each said voxel chunk containing therein a portion of said voxel environment,
wherein respective multiplicities of said voxel chunks comprise respective voxel zone files, a given voxel zone file being transmitted to said web browser, and
wherein said user, interacting with said web browser through said interface, uploads said voxel information in discrete voxel zone files from said memory to said web browser,
wherein, for each voxel chunk in each voxel zone file, said voxel chunk is scanned to remove common voxel faces therein, at least one said common voxel face being removed, and
wherein said user, interacting with said web browser through said interface, initiates said processor to render said voxel information on said web browser, said at least one 3D model being composed of said voxel information.

30. The device for 3D modeling according to claim 29, wherein said plurality of voxel information comprises respective grids of discrete voxel values, each said voxel value corresponding to a respective voxel characteristic.

31. The device for 3D modeling according to claim 29, wherein said plurality of voxel information is uploaded from a server to said web browser.

32. The device for 3D modeling according to claim 29, wherein each said voxel chunk comprises voxel mesh data, voxel data, voxel meta-data and combinations thereof.

33. The device for 3D modeling according to claim 32, wherein said voxel mesh data comprises byte data, integer data, floating point data, and combinations thereof.

34. The device for 3D modeling according to claim 33, wherein said voxel mesh data comprising said byte data, integer data, floating point data, and combinations thereof are extracted by a secondary processing thread.

35. The device for 3D modeling according to claim 32, wherein said voxel mesh data in at least one voxel zone file received at said web browser is directly readable by said web browser for rendering thereon.

36. The device for 3D modeling according to claim 32, wherein said voxel mesh data is from a plurality of voxel zone files.

37. The device for 3D modeling according to claim 32, wherein said voxel data and said voxel meta-data in at least one voxel zone file received at said web browser are sent to at least one interactive function.

38. The device for 3D modeling according to claim 32, wherein said web browser decouples each of said respective voxel zone files transmitted to said web browser into said voxel mesh data, said voxel data and said voxel meta-data.

39. The device for 3D modeling according to claim 38, wherein said voxel mesh data within each voxel chunk within each voxel zone file is directly readable by said web browser.

40. The device for 3D modeling according to claim 39, wherein said voxel mesh data is directly readable using a WebGL protocol.

41. The device for 3D modeling according to claim 38, wherein said voxel data and said voxel meta-data are readable using a JavaScript protocol.

42. The device for 3D modeling according to claim 32, wherein said voxel mesh data comprises a plurality of sets of vertices and a plurality of indices.

43. The device for 3D modeling according to claim 32, wherein said voxel mesh data comprises a plurality of lists of numeric data representing a plurality of triangles and quadrangles employed to construct said at least one 3D model.

44. The device for 3D modeling according to claim 32, wherein said voxel data comprises at least one interaction of said at least one 3D model within said voxel environment.

45. The device for 3D modeling according to claim 32, wherein said voxel meta-data comprise at least one positioning interaction of said at least one 3D model within said voxel environment.

46. The device for 3D modeling according to claim 29, wherein a plurality of said voxel chunks are combined into a voxel zone file, said voxel zone file being uploaded to said web browser.

47. The device for 3D modeling according to claim 29, wherein said 3D modeling is used in gaming, medical imaging, architectural imaging and device modeling.

48. The device for 3D modeling according to claim 29, wherein said device is in communication with a server.

49. The device for 3D modeling according to claim 48, wherein said server is a web server.

50. The device for 3D modeling according to claim 29, wherein the transmission of said respective voxel zone files is done pursuant to a protocol request of said web browser.

51. The device for 3D modeling according to claim 50, wherein said protocol request is selected from the group consisting of HTTP, HTTPS and HTML5.

52. The device for 3D modeling according to claim 29, wherein each of said discrete values within said grids corresponds to an attribute selected from the group consisting of physical attributes and non-physical attributes.

53. The device for 3D modeling according to claim 29, wherein the rendering of said at least one 3D model from said voxel information on said web browser is in real time.

54. The device for 3D modeling according to claim 29, wherein said at least one 3D model comprises voxel information for at least one object, said at least one object selected from the group consisting of a skeleton or body framework, head, arm, hand, fingers, torso, leg, foot, toes, facial features, emotions, hair, scars, skin pores, skin color, rings, body adornment, clothes and combinations thereof.

55. The device for 3D modeling according to claim 29, wherein said voxel environment has a physical attribute, said physical attribute selected from the group consisting of ambient light, Sun light, indoor light, nighttime, stars, colors, gravity, and combinations thereof.

56. The device for 3D modeling according to claim 29, wherein said voxel environment has an interaction, said interaction selected from the group consisting of events in said voxel environment, scaling of at least one object vis-à-vis another object in said voxel environment, collisions of two objects in said voxel environment, interactions between two objects in said voxel environment, and combinations thereof.

57. A method for 3D modeling comprising:
uploading, from a server to a web browser, a plurality of voxel information, said voxel information comprising a plurality of respective overlaid grids, each said grid having discrete values therein, each corresponding said discrete value within each said grid corresponding to a different voxel characteristic,
wherein said voxel information constitutes a voxel environment, different voxel characteristics describing the voxel environment,
wherein said voxel information is divided into a plurality of voxel chunks, each said voxel chunk containing therein a portion of said voxel environment,
wherein respective multiplicities of said voxel chunks comprise respective voxel zone files, a given voxel zone file being transmitted to said web browser;
extracting, from said voxel information uploaded to said web browser, voxel mesh data, voxel data, voxel meta-data and combinations thereof; and
rendering, at said web browser from said voxel mesh data from said given voxel zone file, at least one 3D model from the extracted voxel information
wherein, for each voxel chunk in each voxel zone file, said voxel chunk is scanned to remove common voxel faces therein, at least one said common voxel face being removed.

58. The method according to claim 57, further comprising:
converting said voxel mesh data to a WebGL protocol; and
extracting said voxel data using a JavaScript protocol.

* * * * *